Figure 1:
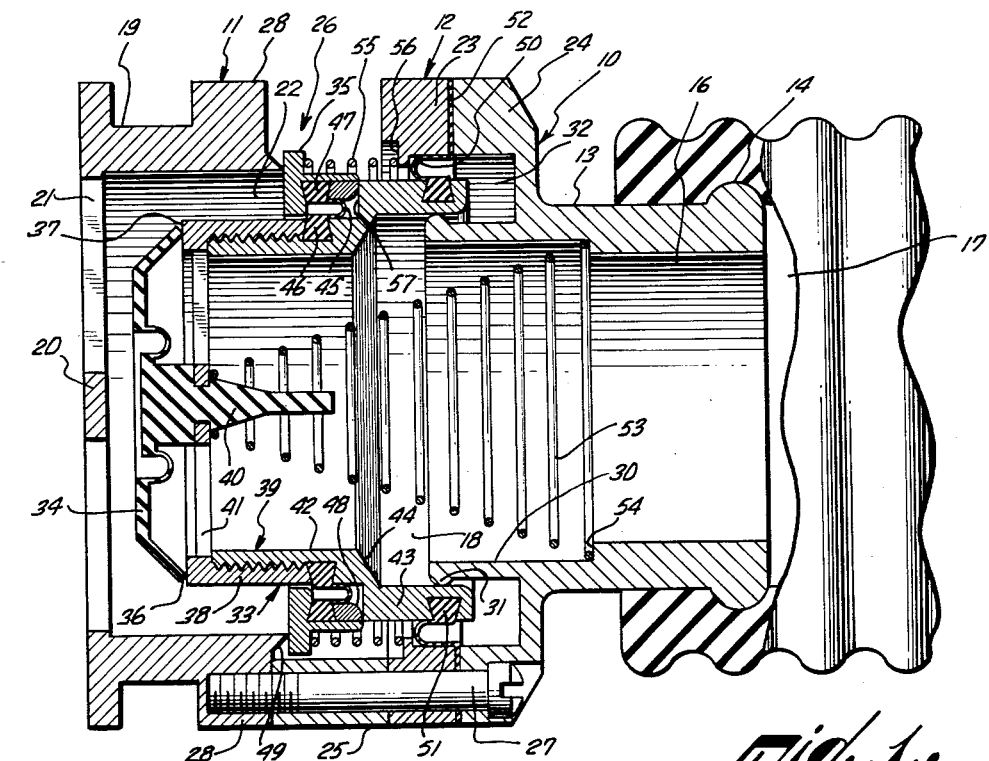

May 22, 1962 A. BLOOM ET AL 3,035,594
COMBINATION INHALATOR-EXHALATOR VALVE WITH HOSE PULL PROTECTION
Filed March 24, 1959

AARON BLOOM
BOB A. KINDRED
INVENTORS.

BY Beehler & Shanahan

ATTORNEYS.

3,035,594
COMBINATION INHALATOR-EXHALATOR VALVE
WITH HOSE PULL PROTECTION
Aaron Bloom, Pasadena, and Bob A. Kindred, San Carlos, Calif., assignors to Sierra Engineering Company, Sierra Madre, Calif., a corporation of California
Filed Mar. 24, 1959, Ser. No. 801,591
4 Claims. (Cl. 137—63)

The invention relates to breathing valves of the type used on respiratory apparatus and more particularly is concerned with a combination valve which admits air or oxygen from a source of supply to a breathing mask and which shuts off the supply when the user exhales through the combination valve permitting the exhaled gases to escape.

Although a number of compact reliable valves have been developed and have been in use for breathing apparatus to perform the service above described, there are certain conditions which may arise to impair the proper functioning of the composite valve. It will be appreciated that although such a valve may work perfectly on practically all occasions, if there are any occasions at all wherein conditions might impair the workability of the valve, its use under circumstances where those conditions might arise may be inconvenient to a considerable degree and in some instances hazardous. Where equipment of the type described is used especially for high altitude flying, the critical valves need to be compensated for extraordinary conditions so that the user has a reliable breathing apparatus at all times.

One of the conditions which has impaired the effectiveness of valves of this kind has resulted from elongation of the hose by means of which gas is supplied from the source of supply to the valve connection. The hose must naturally be very flexible so that it can be moved about freely as the pilot turns his head during the normal course of operating an airplane. The flexibility of the hose must also be relied upon to permit a certain amount of stretch or elongation without pulling loose from the tank or the mask. Since the interior of the hose comprises part of the supply chamber, if the volume of the hose interior alters, this will affect the pressure on the tank side of the combination valve and impair the operation of the inflow check valve causing the pilot discomfort, inconvenience, and necessitating a considerably greater effort to breathe.

It is therefore among the objects of the invention to provide a new and improved combination inhalator-exhalator breathing valve which will compensate for changes in conditions brought about by a stretching or pulling upon the supply hose.

Another object of the invention is to provide a new and improved combination inhalator-exhalator valve which contains in its structure a movable element which will accommodate a change in the volume of the chamber on the supply side of the valve without altering in any fashion the functioning of the inflow check valve and the relief check valve.

Still another object of the invention is to provide a new and improved combination inhalator-exhalator valve of unit construction such that the movable elements of the device are mounted centrally and in conjunction with a single portion of the valve so that all of the movable elements can be sub-assembled and handled as a unit.

Still further among the objects of the invention is to provide a combination inhalator-exhalator valve of simple, dependable construction which is also extremely light in weight, thereby to produce a valve which accommodates the user with the greatest degree of comfort and which moreover is so designed and constructed that the number of moving parts is minimized and the cost is kept within reasonable bounds.

With these and other objects in view, the invention consists in the construction, arrangement and combination of the various parts of the device, whereby the objects contemplated are attained, as hereinafter set forth, pointed out in the appended claims and illustrated in the accompanying drawings.

Figure 2:
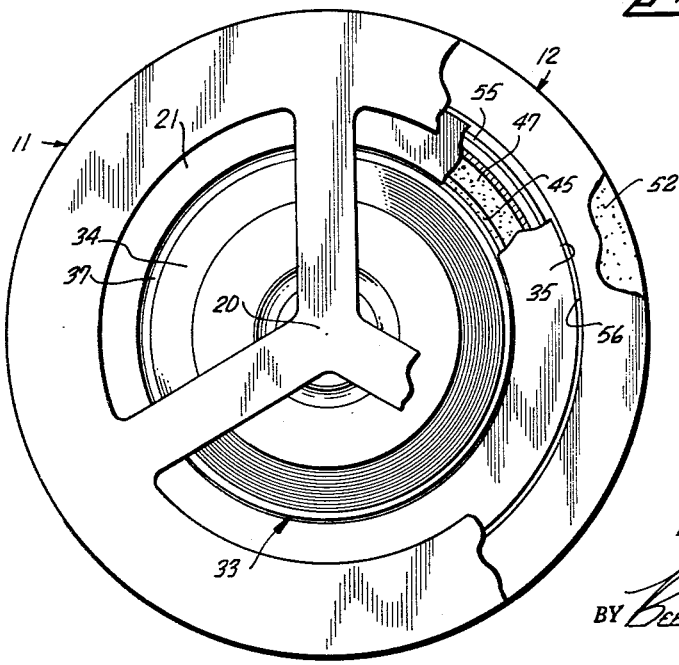

In the drawings:
FIGURE 1 is a longitudinal sectional view of the valve showing the supply hose attached thereto.
FIGURE 2 is an end view taken from the left-hand end of the valve as shown in FIGURE 1 partially broken away to reveal the cross-sectional shape of certain of the parts.

In an embodiment of the invention chosen for the purpose of illustration there is shown a combination inhalator-exhalator valve which comprises a composite body consisting in the main of three elements, namely, a base 10, a cap 11, and a spacer 12. On the base is a neck 13 provided with a bead 14 for attaching and securing a length of supply hose 15 thereto. Within the neck is a supply passage 16 which communicates with the interior 17 of the supply hose on one side and a supply chamber 18 on the opposite side.

The cap 11 is provided with a connection 19 by means of which the valve can be attached to a breathing mask (not shown). A spider 20 serves to reinforce the structure of the cap adjacent a passage 21 by means of which air passes between the mask and an exhalation chamber 22.

The spacer 12 is an annular sleeve-like element consisting of a portion 23 attached to an annular flange 24 of the base and an extension 25 serving to space the portion 23 from the cap 11 to provide exhalation ports 26, one of which is shown in FIGURE 1. The parts are held together by screws 27, as shown in FIGURE 1, wherein the screw extends through the flange 24, the portion 23, and extension 25 into a flange 28 on the cap. When these portions are connected together as shown, they form in essence the valve body comprising the rigid portion of the structure.

Within the base is a guide ring 30 spaced inwardly from the flange 24, leaving an annular space 32 therebetween. The interior of the combination valve consists in the main of a relatively composite axially shiftable sleeve indicated generally by the reference character 33 which mounts an inflow check valve 34 and an exhalation check valve 35.

The inflow check valve 34 is one wherein the valve element is flexible so that an annular edge 36 normally seats upon an annular valve face 37. The annular valve face is formed upon a ring 38 which is threadedly attached to a sleeve 39. A valve stem 40 is secured in a spider 41 which is part of the ring 38. Upon the inhalation phase of the operation, the edge 36 lifts from the valve face due to the resiliency of the valve element.

The sleeve 39 has a section 42 of relatively smaller diameter and a section 43 of relatively larger diameter joined by an intermediate section 44. The section of relatively larger diameter is formed to provide a free sliding fit over the bead 31 of the guide ring 30.

On the section of relatively smaller diameter there is provided a flexible annular seal 45 having one enlarged edge 46 confined in air-tight relationship with the section 42 by use of the ring 38 and another edge 47 anchored in the exhalation check valve 35 by means of a snap ring 48. The exhalation check valve comprising in essence a flat annular valve seat cooperates with an annular knife edge valve element 49 upon the flange 28 of the cap 11.

A second flexible annular seal 50 has one enlarged edge 51 confined in the section 43 of larger diameter and has at the other edge an annular flat section 52 which is confined in sealed relationship between the portion 23 of the spacer 12 and the adjacent space of the flange 24 of the base. The two seals 45 and 50 are of loose fitting character to permit an ample degree of movement of the adjacent parts to which they are attached.

A spring 53 contained upon a shoulder 54 in the base is pressed against the spider 41 and acts to urge the sleeve 33 in a direction from right to left whereby to press the exhalation check valve seat against the valve element 49. This is accomplished by pressure of a land 57 of the sleeve 39 against the adjacent portion of the exhaust check valve 35.

A second and lighter spring 55 bearing upon a shoulder 56 on the portion 23 serves to additionally urge the exhalation check valve 35 to a valve closed position against the valve element 49.

When in normal operation during the inhalation cycle the inflow check valve lifts when gas is supplied from the supply 16 to the mask. During this portion of the cycle the exhalation check valve is closed. Upon the exhalation cycle, the inflow check valve 34 is forced upon its seat by air pressure from the lungs and the pressure acts against the sleeve 33, moving it in a direction from left to right. The air pressure at the same time acts upon the exposed annular flat face of the exhalation check valve and overcomes tension of the spring 55 whereby to unseat the exhalation check valve and permit exhaust of gases from the lungs flowing through the device.

Should there be an inadvertent pull upon the hose 15 tending to lengthen the hose slightly and increase the volume of the interior hose passage, this action would tend to lower the pressure in the supply line and cause the composite sleeve 35 to shift in a direction from left to right, as viewed in FIGURE 1. Were it not for the presence of the spring 55 and independent action of the exhalation check valve 35, this last identified valve would be inadvertently unseated as a result of pull upon the hose. Unseating is prevented in applicants' structure by reason of the fact that although the composite sleeve 33 is shifted in a direction from left to right when pressure in the inflow passage 16 is lowered as a result of pull upon the hose, the exhalation check valve remains seated against the valve element 49 because the seal 45 is flexible whereby the spring 55 holds the exhalation check valve against the seat, even though the composite sleeve be moved.

Should pull continue upon the hose during several breathing cycles, the presence of pull would have no effect upon operation of the exhalation check valve when the user needs to exhale because exhalation pressure would be exercised against that portion of the exhalation check valve within the valve element 49 and would overcome tension of the spring 55 sufficient to unseat the valve and permit exhaust gases to escape through the exhalation ports 26. During the inhalation cycle, while pull remains upon the hose, the inhalation check valve operates in the customary fashion and the spring 55 meanwhile acts to move the exhalation check valve 35 to its former seated position against the valve element 49. Hence, regardless of what the condition may be within the supply passage 16, whether it be lower pressure as a result of pull upon the hose or higher pressure where such pull is released, the valves 34 and 35 will continue to operate regularly and effectively even though there may be a shift in position of the composite sleeve 33. Hence, pressure needed to operate both valves remains perfectly normal under such extraordinary circumstances and breathing continues with the same comfort and effort as exists when there is no pull upon the hose.

Moreover, from the type of construction herein described it will be understood that the base and cap can be separated from each other very readily by removal of the screws 27, in which event the spacer can also be removed and together with it all portions of the composite sleeve 33. The last identified sleeve carrying all moving parts with it can readily be replaced if need be with a new composite sleeve without any readjustment being necessary and the sleeve mentioned after removal can be serviced or repaired at a location equipped especially with tools and jigs for that purpose.

There has accordingly been described herein a simple, positive, combination valve device of unitary construction wherein action of the valve is unaffected by extraordinary conditions which might exist should there be either a temporary or prolonged pull exercised by the supply hose 15.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

We claim:

1. A composite inhalator-exhalator valve device with low pressure protection comprising a valve body, said body comprising a valve base member having a connection for a supply hose and a supply passage through the connection adapted to communicate with the hose, a cap member having a dual-purpose chamber therein and secured in axial relationship to the base member, and exhaust port means in said base member, an annular sleeve within said body, an annular valve element having an axially sliding mounting relative to the sleeve and an annular seat on the cap in operative relation to said valve element whereby to comprise an exhalation check valve, a valve seat on said sleeve, an inhalation check valve mounted on the annular sleeve in cooperative relationship with the valve seat on said sleeve between the supply passage and the dual-purpose passage, resilient means having one end seated in fixed position upon the valve body and the opposite end in engagement against said annular valve element and normally holding said annular valve element in closed position under a predetermined tension for all positions of said sleeve, means normally urging said sleeve and the annular valve element thereon to positions wherein said annular valve element is seated, and flexible closure means between the sleeve and respectively the body and the annular valve element enabling movement of the sleeve in a direction toward said base member unaccompanied by movement of the annular valve seat when subject to a low pressure condition in said supply passage.

2. A composite inhalator-exhalator valve device with low pressure protection comprising a valve body, said body comprising a valve base having a connection for a supply hose and a supply passage through the connection adapted to communicate with the hose, a cap having a dual-purpose chamber therein and secured in axial relationship to the base, and an annular spacer between the base and the cap having exhaust port means therein, an annular sleeve within said spacer, a normally closed annular valve element having an axially sliding mounting on the exterior of the sleeve and an annular seat or the cap in operative relation to said valve element movable away from said seat when subjected to exhalation pressure whereby to comprise an exhalation check valve, a valve seat on the sleeve, an inhalation check valve mounted on said sleeve between the supply passage and the dual-purpose passage and engageable with said seat, a first coiled spring connected at one end to the annular valve element and at the other end to the body normally holding said annular valve element in closed position, a second coiled spring connected at one end to the sleeve and at the other end to the body normally urging said sleeve and the annular valve element thereon to positions wherein said annular valve element is seated, a flexible closure connected respectively to the sleeve and the body and a second flexible closure connected respectively to the sleeve and the annular valve element enabling movement of the sleeve in a direction toward said base unaccompanied by movement of the annular valve element when subject to a low pressure condition in said supply passage.

3. A composite inhalator-exhalator valve device with low pressure protection comprising a valve body, said body comprising a base having a supply chamber therein and an axially extending supply passage in communication with said chamber, a spacer and a cap having intercommunicating axial passages therethrough and releasably secured together with the spacer between the base and the cap, said spacer having exhaust passage means therein, a cylindrical guide ring in the base forming part of said supply passage and forming an annular space between said ring and the body, a sleeve spaced inwardly of the cap and spacer and an annular flexible seal connected between said sleeve and the base, an outwardly extending shoulder on the sleeve and annular valve element extending around said shoulder and slidably positioned on said sleeve, said sleeve having an inside wall at one end surrounding and in sliding relationship with said guide ring and extending into said annular space, a second annular flexible seal connected between the annular valve element and the sleeve, a valve seat on the cap in seating relation to said annular valve element and spring means acting in one axial direction against the body and in the other axial direction against the annular valve element urging said annular valve element to seated position, a ring on the sleeve forming an inhalation check valve seat, an inhalation check valve on said sleeve in seating relationship with said last identified valve seat and a second spring means having one end in engagement with the sleeve and the other end in engagement with the body urging said sleeve under a constant pressure to a position against said annular valve element in all positions of the sleeve whereby to enable movement of said sleeve without movement of said annular valve element under a low pressure condition in the passage to said base.

4. A composite inhalator-exhalator valve device with low pressure protection comprising a valve body, said body comprising a base, a spacer and a cap having intercommunicating axial passages therethrough and releasably secured together with the spacer between the body and the cap, said spacer having exhaust passage means therein, said body having an annular guide in the passage therein, a sleeve spaced inwardly of the cap and spacer having an inner wall at one end slidably mounted around said guide, and an annular flexible seal connected between said one end and the base, an exterior shoulder on the sleeve and an annular valve element resting on said shoulder and slidably positioned on said sleeve, an annular seal of flexible material connected between the annular valve element and the sleeve, a portion of said seal having a position between said shoulder and said annular valve element, a valve seat on the cap in seating relation with said annular valve element and spring means between the spacer and the annular valve element acting in one axial direction against the body and in the other axial direction against the annular valve element urging said annular valve element to seated position, a ring forming an inhalation check valve seat, said ring being threadedly secured on said sleeve in a position of engagement with the last identified annular seal, an inhalation check valve on said sleeve in operating relationship with said last identified valve seat and a second spring means acting between the sleeve and the base urging said sleeve to a position against said annular valve element whereby to enable movement of said sleeve without movement of said annular valve element under a low pressure condition in the passage in said base, said annular valve element being operable in all positions of said sleeve.

References Cited in the file of this patent

UNITED STATES PATENTS

| | | |
|---|---|---|
| 923,808 | Breth | June 8, 1909 |
| 1,233,659 | Fox | July 17, 1917 |
| 2,488,949 | Walsh | Nov. 22, 1949 |
| 2,706,487 | Wilson | Apr. 19, 1955 |
| 2,820,469 | Seeler | Jan. 21, 1958 |
| 2,892,456 | Seeler | June 30, 1959 |
| 2,936,779 | Kindred | May 17, 1960 |